United States Patent [19]

Ross et al.

[11] Patent Number: 5,290,854
[45] Date of Patent: Mar. 1, 1994

[54] THERMOPLASTIC LOW-PROFILE ADDITIVES AND USE THEREOF IN UNSATURATED POLYESTER RESIN COMPOSITIONS

[75] Inventors: Louis R. Ross, Newark, Ohio; Robert J. Schiavone, Geneva, Ill.; Timothy W. Ramey, Chillicothe, Ohio

[73] Assignee: Owens-Corning Fiberglas Technology Inc., Summit, Ill.

[21] Appl. No.: 555,884

[22] Filed: Jul. 23, 1990

[51] Int. Cl.$^5$ ............... C08G 63/48; C08G 63/91; C08L 67/00; C08L 67/02
[52] U.S. Cl. ............................ 525/33; 523/527; 525/35; 528/296
[58] Field of Search .............. 528/296; 523/527; 525/33, 35

[56] References Cited

U.S. PATENT DOCUMENTS

| | | | |
|---|---|---|---|
| 3,549,586 | 12/1970 | Smith et al. | 260/40 |
| 3,650,997 | 3/1972 | Weisfeld et al. | 260/21 |
| 3,652,502 | 3/1972 | Jackson, Jr. | 260/75 R |
| 3,701,748 | 10/1972 | Kroekel | 260/40 |
| 3,718,714 | 2/1973 | Comstock et al. | 260/862 |
| 3,772,241 | 11/1973 | Kroekel | 260/862 |
| 3,833,411 | 9/1974 | Vazirani | 117/232 |
| 3,883,612 | 5/1975 | Pratt et al. | 260/862 |
| 3,909,483 | 9/1975 | Hindersinn et al. | 260/40 R |
| 3,931,422 | 1/1976 | Bateman et al. | 427/424 |
| 3,931,438 | 1/1976 | Beall et al. | 428/218 |
| 4,024,111 | 5/1977 | Thomas et al. | 260/75 T |
| 4,160,758 | 7/1979 | Gardner | 260/40 R |
| 4,245,068 | 1/1981 | Brewbaker et al. | 425/447 |
| 4,263,199 | 4/1981 | Atkins | 260/40 R |
| 4,275,189 | 6/1981 | Danick et al. | 528/296 |
| 4,288,571 | 9/1981 | Comstock et al. | 525/170 |
| 4,374,215 | 2/1983 | Atkins | 523/514 |
| 4,387,211 | 6/1983 | Yasuda et al. | 528/179 |
| 4,446,301 | 5/1984 | Belote et al. | 528/295.3 |
| 4,459,401 | 7/1984 | Sekmakas et al. | 528/296 |
| 4,472,544 | 9/1984 | Ochsenbein et al. | 523/500 |
| 4,504,619 | 3/1985 | Chang et al. | 524/524 |
| 4,525,498 | 6/1985 | Atkins et al. | 523/511 |
| 4,525,524 | 6/1985 | Tung et al. | 524/601 |
| 4,555,534 | 11/1985 | Atkins | 523/507 |
| 4,622,354 | 11/1986 | Iseler et al. | 523/527 |
| 4,735,995 | 4/1988 | Chettiath | 525/301.5 |
| 4,787,989 | 11/1988 | Fanelli et al. | 252/8.6 |

FOREIGN PATENT DOCUMENTS 075765 4/1983 European Pat. Off.
0335406 10/1989 European Pat. Off.

OTHER PUBLICATIONS

STN International Search Results Abstract.

*Primary Examiner*—Paul R. Michl
*Assistant Examiner*—U. K. Rajguru
*Attorney, Agent, or Firm*—Ted C. Gillespie; Patrick P. Pacella

[57] ABSTRACT

A low-profile additive composition is disclosed which comprises ethylene glycol, at least one nonpolar diol, adipic acid and trimellitic anhydride. The low-profile additive, when included in an unsaturated polyester resin systems, for use in making sheet molding compositions, provides improved processing characteristics such as viscosity thickening plateau, paste viscosity and phase separation during maturation when the unsaturated polyester.

15 Claims, 1 Drawing Sheet

THERMOPLASTIC LOW-PROFILE ADDITIVES AND USE THEREOF IN UNSATURATED POLYESTER RESIN COMPOSITIONS

BACKGROUND OF THE INVENTION

The present invention relates to unsaturated polyester resin compositions containing thermoplastic additives. The unsaturated polyester resin compositions have improved viscosity control, phase stability, and tack.

It has long been known in the art of molding thermoset unsaturated polyester compositions that prepolymers of dihydric alcohols and unsaturated dicarboxylic acids may be copolymerized with unsaturated monomers to form molded articles. It has also been known that additional, nonreacting thermoplastic polymers can be added to control the shrinkage that occurs during cure of these resins. These thermoplastics polymers are well-known as "low-profile additives" due to the fact that a "low profile", or highly smooth surface appearance is achieved when these "low profile additives" are used in conjunction with thermoset unsaturated polyester compositions. The unsaturated polyester resin compositions which contain low profile additives are known as "low profile resins" and have improved surface smoothness since the low-profile additives reduce or eliminate the amount of shrinkage that occurs during the cure of the unsaturated polyester resin composition.

Two major systems of low-profile resins currently in use are the one-pack and two-pack systems. The major characteristic that distinquishes the two systems is the degree of compatibility of the low-profile thermoplastic polymer with the unsaturated polyester and styrene. In two-pack systems, if the low-profile additive is incompatible with the unsaturated polyester and monomer copolymer, the resin must be mixed immediately before use in sheet molding composition (SMC) formulations. In one-pack systems, the low-profile additive, unsaturated polyester, and monomer are mutually compatible to the point that no gross phase separation occurs. In both systems, it is the ability of the low-profile resins to compensate for shrinkage that makes them especially useful in SMC formulations.

Thus, shrinkage compensation is the distinguishing characteristic of low-profile resins. The ability of the low-profile resins to compensate for shrinkage is largely a result of a micro-phase separation that occurs during cure for both one- and two-pack systems. Prior to cure, the low-profile additive is at least partly soluble in the polyester/monomer solution. As the polyester/monomer mixture crosslinks and forms a copolymer, the low-profile additive and polyester/monomer copolymer become increasingly less compatible and a two-phase (domain-matrix) type morphology results. This micro-phase separation leads to the formation of a porous structure as the opposing internal stresses of thermal expansion and polymerization shrinkage occur. In many unsaturated polyester resin compositions the porous structure is a result of microfracturing of the curing resins which consequentially gives rise to void formation. It is also known that various unsaturated polyester resin compositions have been developed which have essentially zero shrinkage and which in fact expand upon curing.

The unsaturated polyester resin compositions are used in making sheet molding compound (SMC) formulations which often contain other ingredients such as chemical thickeners. In such SMC formulations, an alkaline material such as magnesium oxide or magnesium hydroxide is added to, for example, an uncured polyester along with fillers, glass fiber, and other standardly used materials. The alkaline material interacts with the residual acidity in the polyester and, usually, in the low-profile additive, to build viscosity. This process is referred to as maturation and usually takes several days. If a two-pack resin system is used, care has to be taken to avoid gross phase separation. After maturation is complete, the thickened SMC formulations are handable and can easily be placed into compression molds either by hand or by machine.

It has previously been established in low-profile additive technology that the acid functionality of the unsaturated polyester or low-profile additive was necessary for control of the thickening or maturation process. For example, the residual acid groups of unsaturated polyesters are one source of carboxylic acids. Thermoplastic additives, such as a polyvinylacetate copolymers, are typically copolymerized with acid functional monomers so that at least one acid functionality is incorporated along the chain of the copolymer. For example, Comstock et al. U.S. Pat. No. 3,718,714 describes a vinyl acetate copolymer that contains an average of at least one carboxyl group per molecule.

Various saturated polyesters have also been used as low-profile additives in unsaturated polyester resins. These saturated polyesters typically contain some residual acid functionality due to the remainder of unreacted carboxyl groups of the starting acids. For example, Hindersinn et al., U.S. Pat. No. 3,909,483 describes saturated polyesters having terminal carboxylic acid groups.

The use of trimelletic anhydride as a comonomer in polyester resins has been described by Chang et al., U.S. Pat. No. 4,504,619 where an unsaturated polyester containing 2,2,4-trimethylpentane diol, isophthalic acid, maleic anhydride and trimellitic anhydride was prepared.

Thomas et al. U.S. Pat. No. 4,024,111 have prepared a dianhydride by reacting 1.5 moles of ethylene glycol with three moles of trimellitic anhydride in order to avoid gellation.

Although generally the use of low-profile additives and thickening agents are known to be effective in improving the thickening characteristics of sheet molding compositions, until now it has previously not been possible to reliably control the viscosity, phase stability and tackiness of unsaturated polyester resin compositions that contain certain thermoplastic low-profile additives.

SUMMARY OF THE INVENTION

Figure 1:
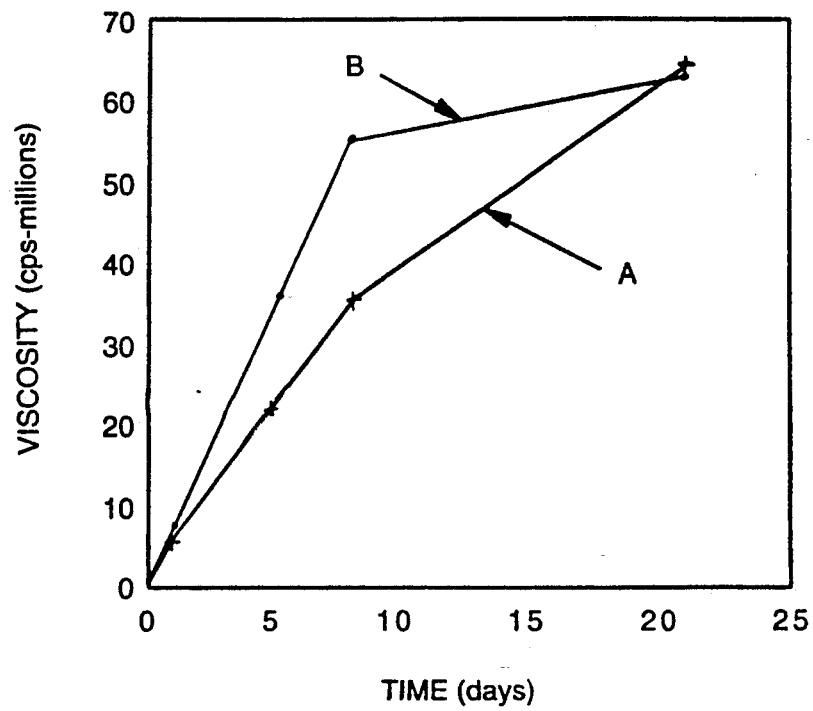
FIG. 1 is a graph comparing the change in viscosity over time of -A- a four component resin having a low-profile additive comprising ethylene glycol, propylene glycol and adipic acid; and -B- a four component resin having a low-profile additive comprising ethylene glycol, propylene glycol, adipic acid and trimellitic anhydride.

The present invention relates to the discovery of a low-profile additive composition comprising ethylene glycol, at least one nonpolar diol, adipic acid, and trimellitic anhydride. It further relates to improved unsaturated polyester resin compositions that contain the described low-profile additive composition. When the low-profile additive composition of the present invention is included with unsaturated polyester resins in SMC formulations, the processing characteristics such as viscosity thickening plateau, paste viscosity, and phase separation during maturation are all improved. In particular, the viscosity of the paste is significantly lower than typically formulated unsaturated polyester resins.

The low-profile additive of the present invention, when added to an unsaturated polyester resin system imparts improved processing characteristics when used with other, known and conventional ingredients for low-profile resin systems useful in making SMC formulations.

DESCRIPTION OF INVENTION

The present invention provides improved low-profile resin compositions which have improved processing characteristics and which are especially useful for composites which are compression molded or injection molded into useful articles. The present invention relates to novel low-profile additive comprising ethylene glycol, at least one nonpolar diol, adipic acid and trimellitic anhydride.

In accordance with the present invention there has now been found that novel curable polyester compositions are obtained when a resinous system contains an ethylenically unsaturated polyester, a polymerizable ethylenically unsaturated monomer, and a saturated polyester low-profile additive comprising ethylene glycol, at least one nonpolar diol, adipic acid, and trimellitic anhydride. The nonpolar diols can comprise 2-methyl-1,3-propane diol (methylpropane diol), 1,2-propane diol (propylene glycol), 1,2-butane diol, mixtures thereof, and the like. It has further been found that such curable polyester compositions when made into sheet molding compound (SMC) formulations, have unusually low paste viscosities. The polyester compositions have the added advantage that the viscosity plateau associated with thickening is easily controlled, and the compositions have no tendency to phase separate during the maturation process. The polyester compositions have excellent mold-fill out and can be cured with little or no shrinkage upon cure, with the resulting cured composites having superior surface smoothness.

In one aspect, this invention comprises an improved sheet molding composition that includes a three component resinous system: (a) an ethylenically unsaturated polyester comprising a polycondensation product of one or more dihydric alcohols and one or more ethylenically unsaturated polycarboxylic acids; (b) one or more olefinially unsaturated monomers which copolymerizes with the unsaturated polyester; and (c) a low-profile additive comprising ethylene glycol, at least one nonpolar diol, adipic acid, and trimellitic anhydride.

In another aspect, the present invention comprises a sheet molding composition that includes a four component resin system comprising (a), (b) and (c) as described above, and further, (d) one or more components that remain compatible when the polyester and monomer cure.

The unsaturated polyester component of the resinous system comprises the polycondensation reaction product of one or more dihydric alcohols and one or more ethylenically unsaturated polycarboxylic acids. By polycarboxylic acid is generally meant the polycarboxylic or dicarboxylic acids or anhydrides, polycarboxylic or dicarboxylic acid halides, and polycarboxylic or dicarboxylic esters. Suitable unsaturated polycarboxylic acids, and the corresponding anhydrides and acid halides that contain polymerizable carbon-to-carbon double bonds may include maleic anhydride, maleic acid, and fumaric acid. A minor proportion of the unsaturated acid, up to about forty mole percent, may be replaced by dicarboxylic or polycarboxylic acid that does not contain a polymerizable carbon-to-carbon bond. Examples of which include o-phthalic, isophthalic, terephthalic, succinic, adipic, sebacic, methyl-succinic, and the like. Dihydric alcohols that are useful in preparing the polyesters include 1,2-propanediol (hereinafter referred to as propylene glycol), dipropylene glycol, diethylene glycol, 1,3-butanediol, ethylene glycol, glycerol, and the like. Examples of suitable unsaturated polyesters are the polycondensation products of (1) propylene glycol and maleic and/or fumaric acids; (2) 1,3-butanediol and maleic and/or fumaric acids; (3) combinations of ethylene and propylene glycols (approximately 50 mole percent or less of ethylene glycol) and maleic and/or fumaric acid; (4) propylene glycol, maleic and/or fumaric acids and dicyclopentadiene reacted with water. In addition to the above described polyester one may also use dicyclopentadiene modified unsaturated polyester resins as described in the Pratt et al. U.S. Pat. No. 3,883,612. These examples are intended to be illustrative of suitable polyesters and are not intended to be all-inclusive. The acid number to which the polymerizable unsaturated polyesters are condensed is not particularly critical with respect to the ability of the low-profile resin to be cured to the desired product. Polyesters which have been condensed to acid numbers of less than 100 are generally useful, but acid numbers less than 70 are preferred. The molecular weight of the polymerizable unsaturated polyester may vary over a considerable range, generally those polyesters useful in the practice of the present invention have a molecular weight ranging from 300 to 5000, and more preferably, from about 500–5000.

In the three component resinous system, the unsaturated polyester is generally present in the amounts ranging from about 20 to 50 percent, by weight, based on the total three component resinous system comprising the unsaturated polyester, the low-profile additive, and monomer. Preferred concentrations of the unsaturated polyester are in the 28 to 38 percent, by weight, range.

In the four component resinous system, the unsaturated polyester is generally present in amounts ranging from about 20 to 45 percent, by weight, based on the total four component resinous system comprising the unsaturated polyester, the low-profile additive, monomer, and compatible component. Preferred concentrations of the unsaturated polyester are in the 28 to 35 percent, by weight, range.

The monomer component of the resinous system comprises materials that copolymerize with the unsaturated polyester. The olefinically unsaturated monomer that is copolymerizible with the unsaturated polyester is most generally styrene, however, methyl-styrene is also useful. In the three component resinous system, the monomer is generally present in amounts ranging from 30 to 65 percent, by weight, based on the total three component resinous system. Preferred concentrations of monomer are in the 40 to 50 percent, by weight, range. In the four component resinous system, the monomer is present in amounts ranging from 25 to 65 percent, by weight, based on the total four component resinous system. Preferred concentrations of monomer are in the 35 to 50 percent, by weight, range.

The compatible component of the resinous system comprises one or more materials that is compatible with the curing unsaturated polyester and monomer. The compatible component, when added to the unsaturated polyester/monomer combination does not cause the necessary microphase separation that occurs with low profile systems; that is, the compatible component does not act like a low profile additive. Examples of compatible components useful in the present invention are compatible components containing one or more polyoxyethane substituents, as disclosed in the copending patent applications, Ser. No. 428,548 filed Oct. 30, 1989, Ser. No. 07/517,775 filed May 2, 1990, and Ser. No. 07/517,863 filed May 2, 1990, which are expressly incorporated herein by reference. These examples are intended to be illustrative of suitable compatible components and are not intended to be all inclusive. In the four component resinous systems, the compatible component is generally present in amounts ranging from 0.5 to 15 percent, by weight, based on the total four component resinous system. Preferred concentrations of the compatible components are in the 1 to 8 percent, by weight, range.

The low-profile additive component of the resinous system comprises materials that when mixed in an unsaturated polyester and cured, result in a multiphase system. If the low-profile additive and the unsaturated polyester are compatible (from the standpoint that a gross phase separation does not take place) before cure, the system is a one-pack system. The low-profile additive of the present invention is particularly useful in one-pack resin systems. In the preferred embodiments, the low-profile additive is present in amounts ranging from about 3 to 30 percent, by weight, based on the total three component resinous system. Especially preferred concentrations of low-profile additive are in the 11 to 18 percent, by weight, range. In the preferred embodiments the low profile-additive is present in amounts ranging from about 5 to 30 percent, by weight, based on the total four component resinous system. Especially preferred concentrations of the low-profile additive are in the 7 to 20 percent, by weight, range.

The low-profile additive of the present invention can be prepared by reacting ethylene glycol and a nonpolar diol such as propylene glycol, with adipic acid and trimellitic anhydride. For example, the reactants are charged into a four liter resin kettle equipped with a nitrogen sparge and a mechanical stirrer. The slurry is stirred under nitrogen and heated to 226° C. The polymerization is complete when the acid number reaches between 15 and 25 and the molecular weight (MW) between 5000 and 35000. In one embodiment, the composition had an acid number of 19.5 and a molecular weight (MW) of 25000. Specific low-profile additive compositions of the invention are shown in Table I below.

TABLE I

| Low-Profile Additive Composition | | |
|---|---|---|
| Reactant | Range (wt. %) | Preferred range (wt. %) |
| ethylene glycol | 0–30 | 15–20 |
| nonpolar diol | 0–30 | 10–15 |
| adipic acid | 50–70 | 64–70 |
| trimellitic anhydride | 0.1–10.0 | 0.4–3.0 |

While this describes a specific low-profile additive composition it is clear that other nonpolar diols, glycols and/or other dicarboxylic acids may be added in low concentrations without disturbing the function of this low-profile additive composition in unsaturated polyester resins.

The low-profile additive composition described above can be included in either a three component resin system or a four component resins system. For example, a three component resins system is listed in Table II and a four component resin system is listed in Table III. The formulations in these two tables are provided to illustrate examples of the compositions of the present invention and are not intended to restrict the scope thereof. All parts are by weight unless otherwise expressly specified.

TABLE II

| Resin Compositions (three component) | | |
|---|---|---|
| Ingredients | Range (wt. %) | Preferred range (wt. %) |
| Unsaturated polyester | 20–50 | 28–38 |
| Low-profile additive | 3–30 | 11–18 |
| Monomer | 30–65 | 40–50 |

TABLE III

| Resin Compositions (four component) | | |
|---|---|---|
| Ingredients | Range (wt. %) | Preferred range (wt. %) |
| Unsaturated polyester | 20–45 | 28–35 |
| Low-profile additive | 5–30 | 7–20 |
| Monomer | 25–65 | 35–50 |
| Compatible component | 0.5–15 | 1–8 |

The resin compositions described in Tables II and III have been found to be useful in sheet molding compound (SMC). For example, the three component and four component resinous systems are suitable for mixing other, known ingredients to make sheet molding composition formulations. These formulations generally include, for example, but are not limited to, chemical thickeners, carrier resins, catalysts, release agents, fillers, pigments and secondary monomers.

Chemical thickeners are physically mixed into the resin emulsion. The chemical thickeners generally include metal oxides, hydroxides and alkoxides of Group II, III or IV from the Periodic Table. Calcium oxide and magnesium oxide or the respective hydroxides are most often employed with the resin compositions of the present invention. In preferred embodiments, the thickener is present in amounts ranging from about 0.5 to about 6 parts, by weight, based on one hundred parts of the resinous system. The thickener is generally suspended in a carrier resin, as is known in the art. In preferred embodiments the carrier material comprises a composition which does not react with the thickener such as, for example, polymethylmethacrylate, polyvinylacetate, saturated or unsaturated polyesters, and similar materials well-known in the art. In preferred embodiments the carrier resin is present in amounts ranging from about 0.5 to about 8 parts, by weight, based on one hundred parts of the resinous system.

Catalysts are incorporated in small amounts into thermosetting polyester resins containing ethylenically unsaturated monomer for curing or cross-linking the unsaturated polyester with the monomer. Such catalysts are well-known and may be similarly utilized in this invention curing the unsaturated polyester and monomer mixed with the low-profile thermoplastic polymer. Typical catalysts, for example, include organic peroxides and peracids such as tertiary butyl perbenzoate, tertiary butyl peroctoate, benzoyl peroxide and the like. The amounts of catalysts may be varied with the molding process and similarly varied with the level and types of inhibitors utilized, in a manner well-known in the art. In preferred embodiments the catalyst is present in amounts ranging from about 0.5 to about 2.5 parts, by weight, based on one hundred parts of the resinous system.

Curing of the composition is carried out under heat and pressure typically, in closed, preferably positive pressure type molds. Mold release agents may be added to the compositions to perform their normal function, as is well understood in the art. In preferred embodiments, the mold release agents are present in amounts ranging from about 0.5 to about 6 parts, by weight, based on one hundred parts of the resinous system.

Fibers, fillers and pigments normally added to resin compositions can be likewise used in formulating the sheet molding composition of this invention. Reinforcing fibers or fibrous reinforcement is taken to means glass fibers in one form or another, such as glass fabrics, chopped glass strands, chopped or continuous strand glass fiber mat; however, the terms also include reinforcing agents which may also be used if desired, for example, asbestos, cotton, synthetic organic fibers and metals. Fillers, usually inert, and inorganic material useful with the compositions of the present invention include, for example, clay, talc, calcium carbonate, silica, calcium silicate, and the like. In preferred embodiments, the fillers are present in amounts ranging from about 165 to about 250 parts, by weight, based on one hundred parts of the resinous system.

Examples of pigments include carbon black, iron oxide, titanium dioxide, and the like, as well as organic pigments. In preferred embodiments the pigments are present in amounts ranging from about 0 to 4 parts, by weight, based on one hundred parts of the resinous system.

In one aspect of the present invention the preparation of the sheet molding composition is generally carried out by blending together a first portion comprising the unsaturated polyester, the low-profile additive, the monomer, the compatible component, and such additives as a catalyst, mold release agent and fillers. This is generally known in the industry as the A-side formulation. The second portion (generally known as the B-side formulation) comprises the thickening agent and a carrier resin therefor, and such additives as pigments and mold release agents. In another aspect of the invention an additional, or secondary, monomer is added to the B-side formulation in which the thickener is suspended. In preferred embodiments the additional monomer comprises vinyl toluene or styrene. In preferred embodiments, the additional monomer is present in amounts ranging from about 1 to 8 parts, by weight, based on one hundred parts of the resinous system.

The sheet molding composition of the present invention can be prepared by mixing the components in a suitable apparatus at temperatures which are conventional and known to those skilled in the art. Once the sheet molding composition is formulated, the composition can be molded into thermoset articles having a desired shape. The actual molding cycle will, of course, depend upon the exact composition being molded. In preferred embodiments suitable molding cycles are conducted at temperatures ranging from about 250°-350° F. for periods of time ranging from about ⅓ to about 5 minutes.

The following ranges shown in Table IV below are provided to illustrate examples of the compositions of the present invention and are not intended to restrict the scope thereof. All parts are parts by weight per one hundred parts resin, unless otherwise expressly specified.

TABLE IV

Sheet Molding Composition Formulations
Parts, By Weight, Based On One Hundred Parts Resin

| Ingredients | Ranges | Formulation A & B |
|---|---|---|
| Resin | 100 | 100 |
| Catalyst | 0.5–2.5 | 1.5 |
| Release Agent | 0.5–6 | 4.5 |
| Filler | 165–250 | 230 |
| Thickener | 0.5–6 | 4.0 |
| Pigment | 0–4 | 0.2 |
| Carrier Resin | 0.5–8 | 2.0 |
| Secondary Monomer | 1–8 | 4.0 |

The sheet molding compositions of the above formulations wherein the low-profile additive comprises ethylene glycol, at least one nonpolar diol, adipic acid and trimellitic anhydride, have shown unexpected improvement during formulation in viscosity control, phase stability and tackiness of the unsaturated polyester resin compositions. In addition, the above formulations have shown unexpected improvements in surface aesthetics and mold fillout. These improvements are especially significant for use in sheet molding compound (SMC).

For formulation A the resin contains the four component resinous system as described in Table III wherein the unsaturated polyester comprises maleic anhydride and propylene glycol; the low-profile additive comprises the saturated polyester made from ethylene glycol, propylene glycol, adipic acid, and trimellitic anhydride (as described in Table I); the monomer comprises styrene, and the compatible component comprises a polypropylene oxide Mol. Wt. (Mn) between 200 and 1000. The additional ingredients comprise the following: the catalyst comprises tertiary butyl perbenzoate, the release agent comprises calcium stearate; the filler comprises calcium carbonate; the thickener comprises magnesium hydroxide; the carrier resin comprises polymethylmethacrylate; the pigment comprises a carbon black suspension; and, the secondary monomer comprises vinyl toluene.

Four component resin systems as described in Table III were prepared. One resin system contained a low-profile additive with trimellitic anhydride and another resin system contained a low-profile additive without the trimellitic anhydride. The low-profile additives had essentially the same molecular weights. Sheet molding composition (SMC) pastes were prepared with the formulation shown in Table IV for the two resins, and the viscosity of each paste was evaluated.

TABLE V

| | Paste Viscosity (centipoise) | |
| --- | --- | --- |
| | Four Component Resin With Low-Profile Additive of Ethylene Glycol, Propylene Glycol Adipic Acid and Trimellitic Anhydride | Four Component Resin With Low-Profile Additive of Ethylene Glycol, Propylene Glycol and Adipic Acid |
| Initial | 9,600 | 48,000 |
| After 1 day at 90° F. | 8,000,000 | 6,000,000 |
| 5 days | 36,000,000 | 22,000,000 |
| 8 days | 55,000,000 | 36,000,000 |
| After 3 weeks | 63,000,000 | 64,500,000 |

The data in Table V above and in FIG. 1 show that the modification of the low-profile additive by the addition of trimellitic anhydride results in a resin composition wherein there is an initial lowering of the viscosity. After about 1 day, this is followed by an initial increase in the rate of thickening process. After about 5 days, this is followed by a plateau of the thickening process. This rate of thickening is beneficial in that a longer period of time is available for use of the resin composition in the molding process.

In addition to the viscosity control it was noted that a phase separation occurred with the resin system without the trimellitic anhydride modified additive. This phase separation was not apparent with the paste with the trimellitic anhydride modified additive.

For formulation B the resin contains the three component resinous system as described in Table II wherein the unsaturated polyester comprises maleic anhydride and propylene glycol; the low-profile additive comprises the saturated polyester made from ethylene glycol, propylene glycol, adipic acid, and trimellitic anhydride (as described in Table I); and the monomer comprises styrene. The additional ingredients comprises the following: the catalyst comprises tertiary butyl perbenzoate; the release agent comprises calcium stearate; the filler comprises calcium carbonate; the thickener comprises magnesium hydroxide; the carrier resin comprises polymethylmethacrylate; the pigment comprises a carbon black suspension; and, the secondary monomer comprises vinyl toluene.

One resin system contained the low-profile additive with trimellitic anhydride and another resin system contained a low-profile additive without the trimellitic anhydride. The molecular weights of each of the low-profile additives were essentially the same.

Three component resin systems as described in Table II were prepared. SMC pastes were prepared with the formulation described in Table IV for the two resins, and the viscosity of each paste was evaluated.

TABLE VI

| | Paste Viscosity (centipoise) | |
| --- | --- | --- |
| | Three Component Resin With Low-Profile Additive of Ethylene Glycol, Propylene Glycol Adipic Acid and Trimellitic Anhydride | Three Component Resin With Low-Profile Additive of Ethylene Glycol, Propylene Glycol and Adipic Acid |
| Initial | 88,000 | 96,000 |
| After 1 day | 9,760,000 | 9,070,000 |
| After 21 days | 59,200,000 | 65,200,000 |

Figure 2:
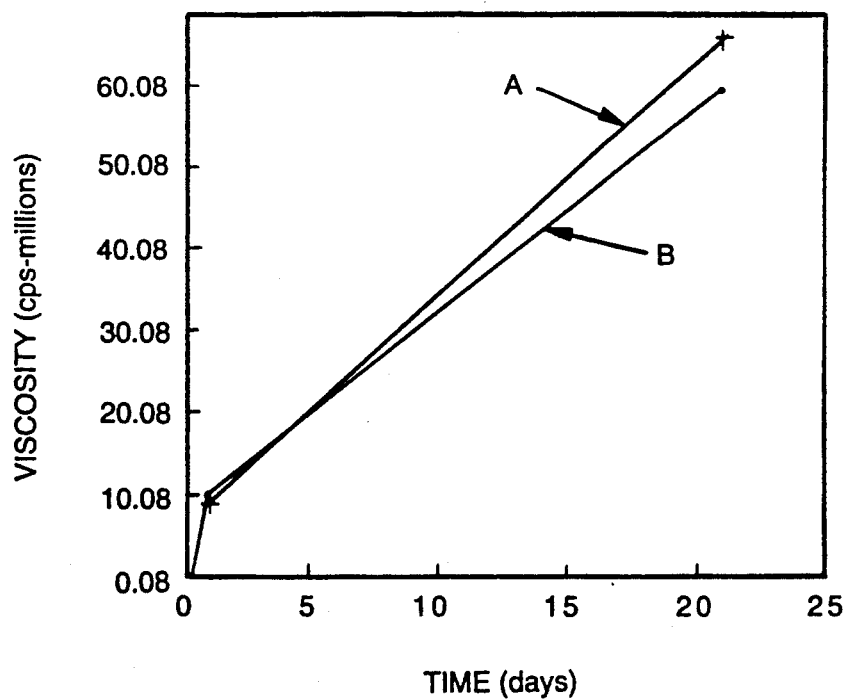
FIG. 2 is a graph comparing the change in viscosity over time of -A- a three component resin having a low-profile additive comprising ethylene glycol, propylene glycol and adipic acid; and, -B- a three component resin having a low-profile additive comprising ethylene glycol, propylene glycol, adipic acid and trimellitic anhydride.

The data in Table VI above and FIG. 2 show that modification of the low-profile additive by the addition of trimellitic anhydride results in a resin composition wherein there is an initial lowering of the viscosity. This is followed by a gradual increase in the rate of thickening process. This gradual rate of increasing thickening is beneficial in SMC formulations since the resin composition has a longer shelf life which consequently lengthens the period of time available for use of the resin composition in a molding process.

Although the invention has been described in its preferred form with a certain degree of particularity, it is understood that the present disclosure has been made only by way of example, and that numerous changes can be made without departing from the spirit of the scope of the invention.

We claim:

1. A saturated low-profile additive thermoplastic polymer for use in a sheet molding composition, the thermoplastic polymer comprising ethylene glycol, at least one nonpolar diol, adipic acid and trimellitic anhydride.

2. The low-profile additive thermoplastic polymer of claim 1 consisting essentially of, by weight percent: ethylene glycol 0-30 weight percent; at least one nonpolar diol, 0-30 weight percent; adipic acid 50-70 weight percent; and, trimellitic anhydride 0.1-10.0 weight percent.

3. The low-profile additive thermoplastic polymer of claim 1 consisting essentially of, by weight percent: ethylene glycol 15-20 weight percent; at least one nonpolar diol, 10-15 weight percent; adipic acid 64-70 weight percent; and trimellitic anhydride 0.4-3.0 weight percent.

4. The low profile additive thermoplastic polymer of claim 1, wherein the nonpolar diol comprises 2-methyl-1,3-propane diol, 1,2-propane diol, 1,3-butane diol or a mixture thereof.

5. A resinous system for a sheet molding composition comprising:
   (a) an unsaturated polyester comprising a polycondensation product or one or more dihydric alcohols and one or more ethylenically unsaturated polycarboxylic acids;
   (b) at least one low-profile thermoplastic polymer of claim 1; and,
   (c) at least one olefinically unsaturated monomer which copolymerizes with the unsaturated polyester.

6. The resinous system of claim 5 further comprising (d) at least one component which is compatible with the unsaturated polyester and monomer.

7. The composition of claim 5, wherein the unsaturated polyester comprises the polycondensation product of at least one dihydric alcohol and at least one ethylenically unsaturated polycarboxylic acid.

8. The composition of claim 7, wherein the unsaturated polyester comprises the polycondensation product of maleic and/or fumaric acids and propylene glycol; the polycondensation product of 1,3-butanediol and maleic and/or fumaric acids; the polycondensation product of ethylene and propylene glycols comprising approximately 50 mole percent or less of ethylene glycol, and maleic and/or fumaric acids; the polycondensation product of propylene glycol, maleic and/or fumaric acids and dicyclopentadiene reacted with water; or the polycondensation product of propylene glycol, maleic and/or fumaric acids and isophthalic acid.

9. The composition of claim 5, wherein the monomer comprises styrene, methyl-styrene or vinyl toluene.

10. The composition of claim 5, wherein the unsaturated polyester is present in an amount of approximately 20–50 percent, by weight; the low-profile thermoplastic polymer is present in an amount of approximately 3–30 percent, by weight; the monomer is present in an amount of approximately 30–65 percent, by weight, of the resinous system.

11. The composition of claim 10, wherein the unsaturated polyester is present in an amount of approximately 28–38 percent, by weight; the low-profile thermoplastic polymer is present in an amount of approximately 11–18 percent, by weight; the monomer is present in an amount of approximately 40–50 percent, by weight, of the resinous system.

12. The composition of claim 6, wherein the unsaturated polyester is present in an amount of approximately 20–45 percent, by weight; the low-profile thermoplastic polymer is present in an amount of approximately 5–30 percent, by weight; the monomer is present in an amount of approximately 25–65 percent, by weight; the compatible component is present in an amount of approximately 0.5–15 percent, by weight, of the resinous system.

13. The composition of claim 12, wherein the unsaturated polyester is present in an amount of approximately 28–35 percent, by weight; the low-profile thermoplastic polymer is present in an amount of approximately 7–20 percent, by weight; the monomer is present in an amount of approximately 35–50 percent, by weight; the compatible component is present in an amount of approximately 1–8 percent, by weight, of the resinous system.

14. A sheet molding composition comprising a resinous system as defined in claim 5, fillers, thickeners, catalysts and reinforcing glass fibers.

15. A sheet molding composition comprising a resinous system as defined in claim 6, fillers, thickeners, catalysts and reinforcing glass fibers.

* * * * *